US008615160B2

(12) United States Patent
Peacock et al.

(10) Patent No.: US 8,615,160 B2
(45) Date of Patent: Dec. 24, 2013

(54) MEDIA PLAYER INSTANCE THROTTLING (75) Inventors: Gavin Peacock, Walnut Creek, CA (US); Rupen Chanda, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 420 days.

(21) Appl. No.: 12/819,136

(22) Filed: Jun. 18, 2010

(65) Prior Publication Data
US 2013/0163953 A1    Jun. 27, 2013

(51) Int. Cl.
*H04N 9/80*  (2006.01)

(52) U.S. Cl.
USPC .......................................................... 386/248

(58) Field of Classification Search
USPC .......... 386/239, 243, 248, 353, 354, 355, 356
See application file for complete search history.

(56) References Cited

U.S. PATENT DOCUMENTS

| 5,867,160 | A | 2/1999 | Kraft, IV et al. |
| 6,353,460 | B1 * | 3/2002 | Sokawa et al. ................. 348/555 |
| 6,397,343 | B1 | 5/2002 | Williams et al. |
| 6,775,461 | B2 * | 8/2004 | Poslinski et al. .............. 386/283 |
| 7,234,126 | B2 | 6/2007 | Catthoor et al. |
| 7,450,130 | B2 | 11/2008 | Swedberg et al. |
| 8,291,460 | B1 | 10/2012 | Peacock |
| 8,296,783 | B1 | 10/2012 | Piira et al. |
| 2002/0186212 | A1 * | 12/2002 | Matsumoto et al. .......... 345/204 |
| 2003/0140159 | A1 | 7/2003 | Campbell et al. |
| 2004/0156624 | A1 | 8/2004 | Kent et al. |
| 2004/0179618 | A1 | 9/2004 | Romriell et al. |
| 2004/0201608 | A1 * | 10/2004 | Ma et al. ....................... 345/719 |
| 2005/0120391 | A1 | 6/2005 | Haynie et al. |
| 2005/0128220 | A1 | 6/2005 | Marin et al. |
| 2006/0026294 | A1 | 2/2006 | Virdi et al. |
| 2006/0062292 | A1 * | 3/2006 | Boice et al. ............... 375/240.01 |
| 2006/0100021 | A1 * | 5/2006 | Yoshino et al. ................. 463/45 |
| 2007/0271388 | A1 | 11/2007 | Bowra et al. |
| 2008/0281867 | A1 | 11/2008 | Kendall et al. |
| 2008/0319818 | A1 | 12/2008 | Gurdin et al. |
| 2009/0061987 | A1 | 3/2009 | Canterbury et al. |
| 2009/0147854 | A1 * | 6/2009 | Dane et al. ............... 375/240.16 |
| 2009/0185625 | A1 | 7/2009 | Lee et al. |
| 2010/0278506 | A1 * | 11/2010 | Subbian et al. ................. 386/66 |

OTHER PUBLICATIONS

U.S. Appl. No. 12/750,630, filed Mar. 30, 2010, Peacock.

(Continued)

*Primary Examiner* — Tat Chio
(74) *Attorney, Agent, or Firm* — Wolfe-SBMC (57) ABSTRACT A method including loading multiple instances of a media player program to render respective media content in respective visible portions of a graphical user interface of a computing device, the graphical user interface associated with an additional program configured to render additional content, different than the media content, to the graphical user interface; determining that a first of the multiple instances of the media player program takes precedence over a second of the multiple instances of the media player program; and modifying an allocation, associated with processing media content by the second of the multiple instances of the media player program, in accordance with a rendering limitation associated with the computing device.

20 Claims, 6 Drawing Sheets (56) References Cited

OTHER PUBLICATIONS

Walpole, et al. "A Player for Adaptive MPEG Video Streaming Over the Internet", Proceedings, 1997, 12 pages, In Proceedings 26$^{th}$ Applied Imagery Pattern Recognition Workshop APIR-97, Department of Computer Science and Engineering, Oregon Graduate Institute of Science and Technology, Oregon, USA.

WebSiteOptimization.com "JavaScript: Refer Execution." [online], [retrieved on Jun. 1, 2009]. Retrieved from the Internet <URL: http://www.websiteoptimization.com/speed/tweak/defer>, 6 pages.

Osdir.com "Dynamically Loading Plugins, etc." [online], [retrieved on Jun. 1, 2009]. Retrieved from the Internet <URL: http://osdir.com/ml/editors.jedit.devel/2002-07/msg00101.html>, 2 pages.

Developer.com "Lazy Loading the ASP.NET AJAX TabContainer Control." [online], [retrieved on Jun. 1, 2009]. Retrieved from the Internet <URL: http://www.developer.com/net/asp/article.php/3738616>, 5 pages.

Appelsiini.net "Lazy Load—Image Lazy Loader Plugins for jQuery." [online], [retrieved on Jun. 1, 2009]. Retrieved from the Internet <URL: http://www.appelsiini.net/projects/lazyload>, 2 pages.

Developer.apple.com "Runtime Environment." [online], [retrieved on Jun. 1, 2009]. Retrieved from the Internet <URL: http://developer.apple.com/documentation/networking/Conceptual/Open_Dir_Plugin/RuntimeEnvironment/Ru>, 2 pages.

Xidong, "A Game-Theoretic Dynamic Power Management Policy on Wireless Sensor Network", International Conference on Communication Technology, (ICCT '06), 2006, 4 pages.

\* cited by examiner

MEDIA PLAYER INSTANCE THROTTLING

BACKGROUND

This specification relates to operations performed in conjunction with media content rendering.

The Internet is widely used to distribute media content, including video, graphic, audio, and scripting data. Media content can be downloaded as a file, or streamed to a client computer, where a media player application can process and output the media content to a display device and, if applicable, one or more speakers. The media player application or an application including media player functionality, in some examples, can be a program written for a particular operating system (OS) on a computer platform or a "plug-in" based software that runs inside another program, such as a runtime environment, on a computer platform.

The rate at which media content is presented upon a user device can depend upon a number of factors, including timing information received within an audio track, a developer suggested frame rate, or a device refresh rate. If the media content is not locked to timing information such as an audio track, the actual frame rate can depend upon the processing rate of the user device or the current processor load. If the processor is too slow, or the processor has too many applications vying for processing time at once, the frame rate of particular media content rendered upon the user device can slow to a frame rate which is too slow for the user to properly experience. For example, the media content can appear to be stalled or choppy.

SUMMARY

This specification describes technologies relating to operations performed in conjunction with media content rendering.

In general, one innovative aspect of the subject matter described in this specification can be embodied in methods that include loading multiple instances of a media player program to render respective media content in respective visible portions of a graphical user interface of a computing device, the graphical user interface associated with an additional program configured to render additional content, different than the media content, to the graphical user interface; determining that a first of the multiple instances of the media player program takes precedence over a second of the multiple instances of the media player program; and modifying an allocation, associated with processing media content by the second of the multiple instances of the media player program, in accordance with a rendering limitation associated with the computing device.

Other embodiments of this aspect include corresponding systems, apparatus, and computer programs, configured to perform the actions of the methods, encoded on computer storage devices.

These and other embodiments can each optionally include one or more of the following features. Embodiments can further include receiving information from the additional program that indicates the respective visible portions of the graphical user interface to which the multiple instances of the media player program render their respective media content; and determining that an actual frame rate associated with the first of the multiple instances of the media player program is lower than a target frame rate associated with the first of the multiple instances of the media player program; and the modifying can include reducing the allocation to increase the actual frame rate associated with the first of the multiple instances of the media player program. Moreover, the modifying can include specifying a number of delay cycles to apply to a code section of the second of the multiple instances of the media player program, the code section configured to: process a set of time-relevant events received by the second of the multiple instances of the media player program; and exit the code section, when the number of delay cycles has not been reached, before a media content rendering portion of the code section.

The determining can include comparing a first priority level associated with the first of the multiple instances of the media player program and a second priority level associated with the second of the multiple instances of the media player program, where the first priority level is one of at least three respectively-ranked priority levels. Embodiments can further include: identifying a target frame rate associated with the first of the multiple instances of the media player program; monitoring an actual frame rate of the first of the multiple instances of the media player program over a period of time, after modifying the allocation; and modifying an allocation, associated with processing media content by a third of the multiple instances of the media player program, based on a comparison of the actual frame rate with the target frame rate, the third of the multiple instances of the media player program having a third priority level, the third priority level being next in rank to the second priority level.

The at least three priority levels can include a nonadjustable priority level ineligible for processing allocation modification. The multiple instances of the media player program can render respective media content within a single graphical user interface window, and the at least three priority levels can be ranked respectively using a set of prioritization rules, including a sizing prioritization rule based upon respective dimensions of the respective visible portions of the graphical user interface in which the multiple instances of the media player program render.

The allocation can be a processing time allocation, and embodiments can further include modifying a memory allocation that impacts a rendering optimization affecting a frame rate of the second of the multiple instances of the media player program while maintaining a substantially identical visual output to the graphical user interface. The rendering limitation can be a central processing unit usage threshold.

Other innovative aspects of the subject matter described in this specification can be embodied in a computer storage medium encoded with a computer program including instructions that when executed by data processing apparatus cause the data processing apparatus to perform operations as described. In addition, a system can include a display device; a computer storage medium; and one or more processors operable to interact with the display device and to perform operations as described. The display device, the medium and processor(s) can be part of single consumer electronic device, such as a mobile telephone, a personal digital assistant (PDA), a mobile audio or video player, a game console, a television, a Global Positioning System (GPS) receiver, or a portable storage device, etc. Alternatively, the display device, the medium and processor(s) can be divided among two or more distinct components, which can be locally connected or remotely connected by a network.

Particular embodiments of the subject matter described in this specification can be implemented to realize one or more of the following advantages. When loading multiple instances of media content on a device with limited resources, such as a small mobile computing device, the media content can be evaluated to determine precedence, and the highest precedence content can take priority over additional media content being rendered to the display. User experience of media content can be improved by downgrading the user experience of additional media content being rendered to the screen. Media content other than the highest precedence media content can receive an adjustment in a processing allocation, such as fewer CPU cycles for rendering media content or a smaller section of memory for caching information. The processing allocation adjustment, for example, can work to slow the actual frame rate of media content rendered to the display. In some implementations, user interaction with the graphical user interface can be tracked to monitor a movement of precedence of media content on the display. For example, user interaction with particular media content, such as clicking on the section of the display where the media content is being rendered, can raise the precedence of that content.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
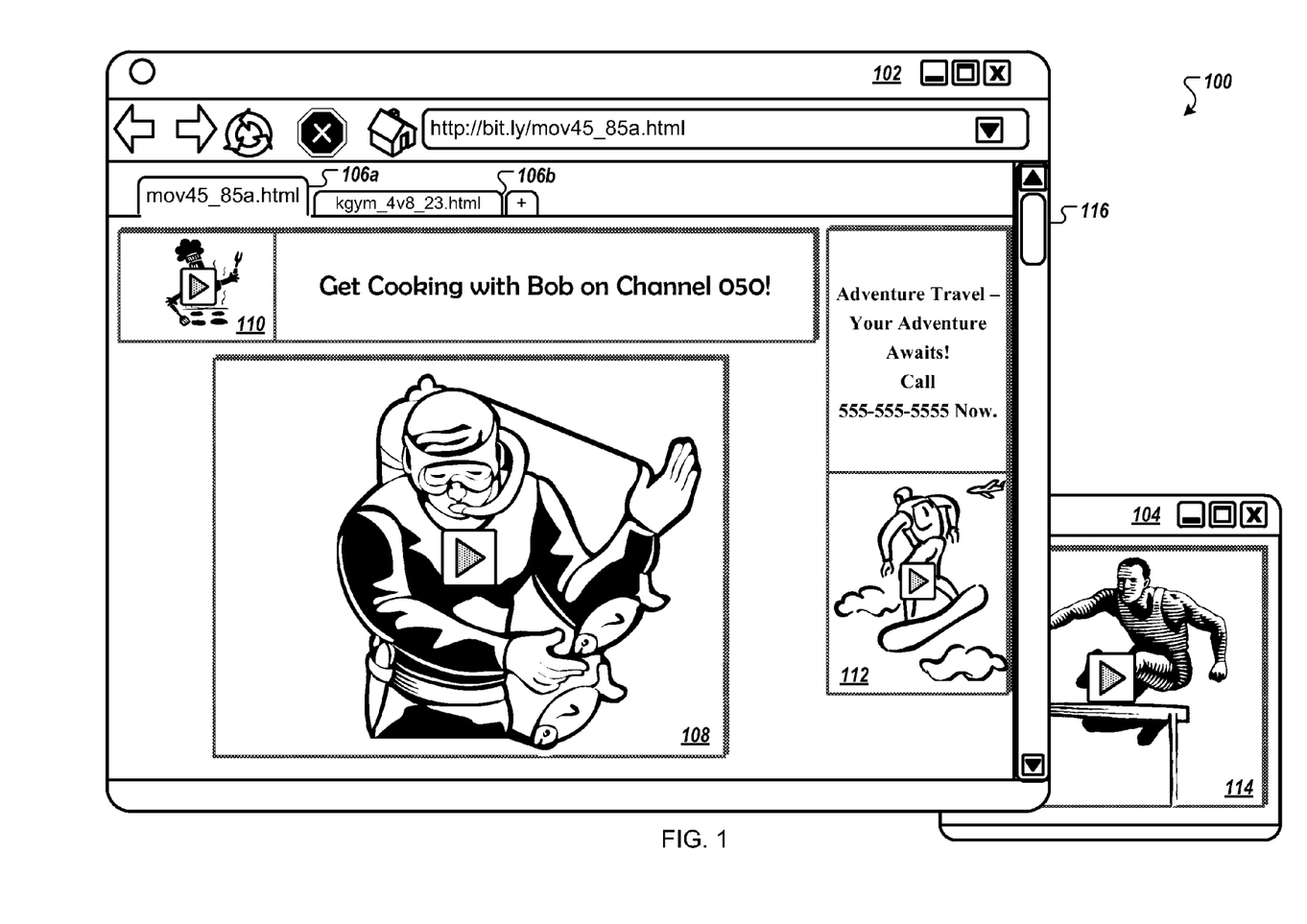
FIG. 1 is a screen shot illustrating multiple instances of a media player program rendering content in a graphical user interface of a computing device.

FIG. 1 is a screen shot 100 illustrating multiple instances of a media player program rendering content in a graphical user interface (GUI) of a computing device, which can include a personal computer, a mobile telephone, a personal digital assistant (PDA), a mobile audio or video player, a game console, a television, a Global Positioning System (GPS) receiver, or a portable storage device, to name just a few. When two or more instances of a media player program are rendering content to the GUI of a computing device, the individual instances can compete for system resources such as processing time and memory. Typically, a user focuses on a single primary instance (e.g., a single video, interactive computer game, etc.) while other instances run in the background. If the computing device contains limited resources, or if the processor of the computing device is temporarily overloaded, the instances rendering media content to the GUI can compete for the limited resources, and user experience can suffer. By focusing resources towards the primary instance, the media player program can work to maintain the user experience while throttling other instances being rendered to the GUI.

The screen shot 100 includes a main window 102 (e.g., a main browser window) partially overlaying a pop-up window 104. The main window 102 includes two tabs 106, an active tab 106a and an inactive (e.g., obscured) tab 106b. As shown in the main window 102, a main video 108 is playing as well as a banner advertisement (ad) video 110 and a right margin ad video 112. The pop-up window 104 includes a pop-up video 114 as well, partially obscured by the main window 102. Each of the videos 108 through 114 can be correlated to a media player program instance, rendering media content to the portion of the screen shot 100 in which the corresponding video is positioned. The inactive tab 106b may include references to one or more media player program instances as well, not currently visible. There may also be additional media player program instances outside of the portion displayed in the active tab 106a, for example accessible through navigation using a scroll bar 116.

An application (e.g., a browser application) can receive media content rendered to one or more of the videos 108 through 114 from a media player program. The application, for example, can provide the media player program with position and size information for each of the videos 108 through 114. The application can, in some implementations, provide additional information relevant to the videos 108 through 114, such as an indication that the pop-up video 114 is partially obscured or being rendered in an inactive window, while the videos 108, 110, and 112 are being rendered within an active window. In other examples, cursor position, last position selected (e.g., clicked) within the window 102, or a priority setting within the application rendering code (e.g., a flag within the hypertext markup language) can be provided to the media player program from the application. This information can be used by the media player program to determine a media player instance which takes precedence (e.g., a primary focus video) among the videos 108 through 114 within the screen shot 100.

In addition to information available at the time at which the windows 102 and 104 are loading, in some implementations the application can provide event notifications, such as user clicks, to the media player program so that the media player program can track the movement of user focus among the videos 108 through 114. For example, if the user selected the pop-up window 104, the media player program could identify the pop-up video 114 as having highest precedence rather than the main video 108.

Although more videos may be available within the tabs 106 (e.g., in the inactive tab 106b or in a hidden portion of the content available through the active tab 106a), in some implementations, the media player program only renders media content to visible portions of the GUI. For example, the media player program can receive an indication from the application regarding which instances are positioned in a visible portion of the GUI.

The media player program can determine a primary focus video based in part upon the information provided by the application. In some implementations, the media player program determines an order of precedence for all of the instances rendering the videos 108 through 114, including two or more levels of priority. The media player program can consider a set of rules when determining which instance takes precedence. The rules, in some examples, can include relative size, position, user interaction, HTML (HyperText Markup Language) priority flag, or media content priority flag. For example, the media player program can determine that the instance associated with the main video 108 has precedence over the instances associated with the remaining videos 110 through 114 because the main video 108 is rendered in the active tab 106a and because the main video 108 is the largest and most centrally located video within the active tab 106a.

After determining a priority instance, the media player program can modify an allocation associated with one or more of the other instances rendering video content to the screen shot 100 to free resources for the priority instance. For example, the media player program can reduce the frame rate of instances other than the priority instance. In another example, the media player program can reduce a memory allocation for instances other than the priority instance. For example, an instance other than the priority instance can receive a reduction in cache memory allocation or a reduction in buffer allocation, while the priority instance receives a similar increase in memory allocation, allowing for more efficient graphic processing and, potentially, increased frame rate. If the media player program has ranked the instances into multiple priority categories, the media player program can reduce an allocation provided to the lowest ranked instances. For example, the instance associated with the partially obscured pop-up video 114 may be given a lower priority category than the instances associated with the ad videos 110 and 112 rendered to the active tab 106a. If the media player program determines that further resources are needed by the primary instance, the media player program can later reduce an allocation provided to the next-lowest ranked instances (e.g., the instances associated with the ad videos 110 and 112).

In some implementations, the media player program determines that the priority instance requires more resources by determining a target frame rate associated with the priority instance, monitoring the actual frame rate of the priority instance, and comparing the actual frame rate to the target frame rate. If the actual frame rate falls below the target frame rate, the media player program can reduce a processing allocation of one or more other instances to free resources for the priority instance. The central processing unit (CPU) usage level, in some implementations, is taken into consideration by the media player program when determining whether to throttle a processing allocation of one or more instances.

The primary instance can change over time depending upon user interaction. In some examples, scrolling downwards in the active tab 106a using the scroll bar 116 or selecting the pop-up window 104 can change the primary instance and, in the case of scrolling, change the number and type of the remaining instances being monitored as well. For example, by scrolling within the active tab 106a, the banner ad video 110 can scroll off the screen, while additional media content can become visible in the GUI.

In some implementations, the primary instance may have previously undergone a processing allocation modification. For example, if the user selects the pop-up window 104, the pop-up video 114 can be upgraded from one of the lower priority instances (e.g., due to being partially obscured) to being the primary instance. In this case, the previously applied processing allocation modification can be removed or reversed.

While the instances, as shown in FIG. 1, are associated with media content rendering to multiple application windows, in some implementations, the media player program can monitor instances rendering media content within a single window, to an application managed by the media player program, to two or more applications from different companies both rendering to a single display, to another separate application, or to a combination thereof. Although all of the instances described in relation to FIG. 1 are associated with video (e.g., movie) content, in some implementations, the media content rendered can be associated with an interactive video game, streaming multimedia software application, or other content including a stream of video data.

Figure 2:
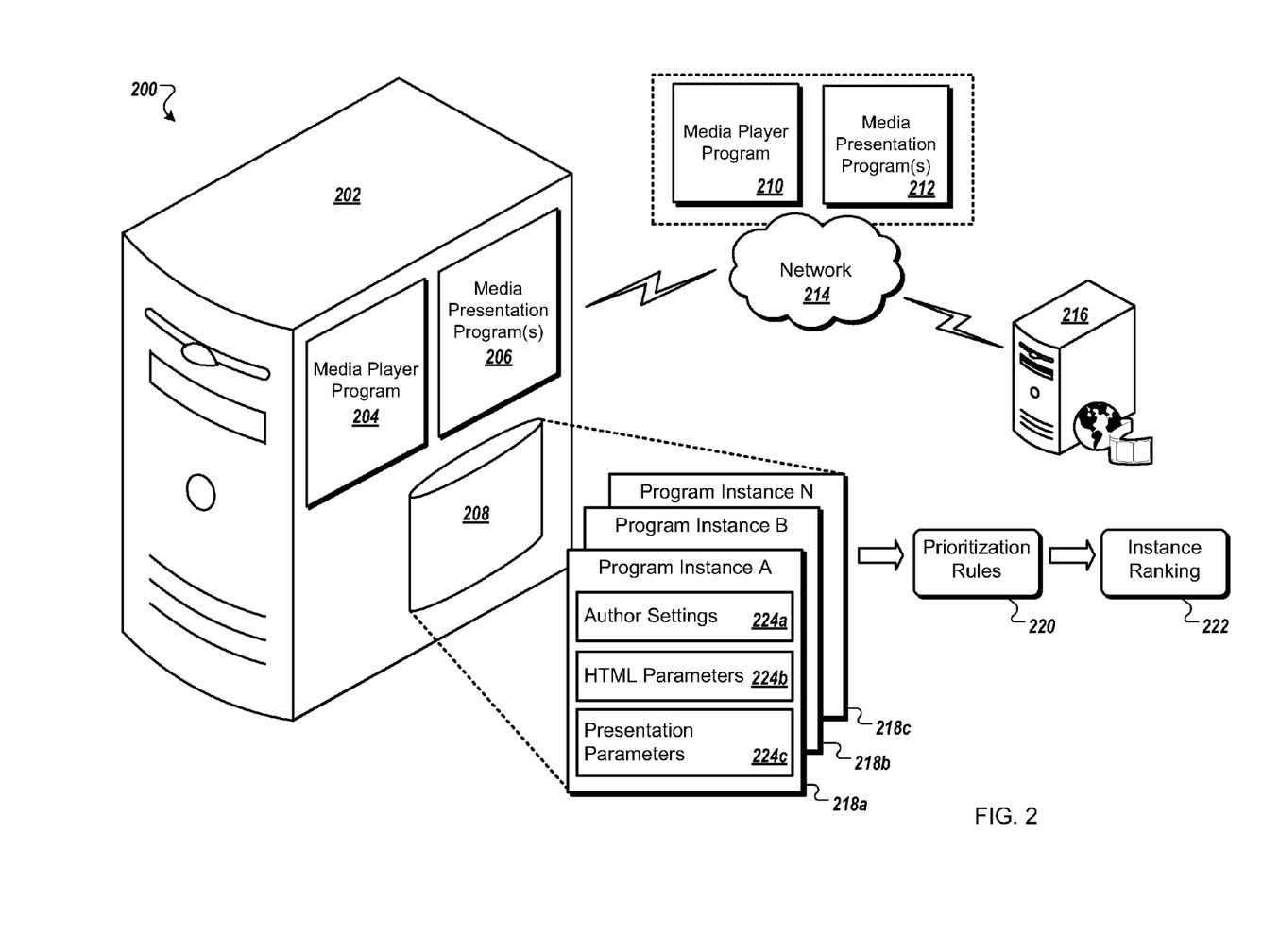
FIG. 2 is a block diagram of an example of a system for throttling media player instances controlled by a media player program.

FIG. 2 is a block diagram of an example of a system 200 for throttling media player instances controlled by a media player program 204. The media player program 204 and one or more media presentation programs 206, such as a browser application, can be installed upon a client device 202. Alternatively, or additionally, a media player program 210 or one or more media presentations programs 212 can be accessed by the client device 202 through a network 214. The media player program 210 or media presentation program(s) 212, for example, can be made available through a cloud computing environment or from a remotely located server. The media player program 204 or 210 can access media content, for example from one or more media servers 216 or from another local or remote storage medium, such as a storage medium 208 in the client device 202.

The media player program 204 installed on the client device 202, for example, can track multiple media player program instances 218a, 218b, 218c, each program instance 218 associated with one or more instance characteristics 224, such as author settings 224a, HTML parameters 224b, or presentation parameters 224c. The instance characteristics 224 can be provided to a set of prioritization rules 220 to determine an order of precedence associated with the instances 218. For example, the prioritization rules 220 can be applied to the instance characteristics 224 to determine an instance ranking 222. In simplest terms, the instance ranking 222 can determine a priority instance which has precedence over the other instances 218. In some implementations, the instances 218 can be ranked according to multiple levels of priority. Based upon the instance ranking 222, for example, the media player program 204 (or, alternatively, the media player program 210) can modify a processing allocation associated with instances 218 other than the primary instance.

In more detail, the author settings 224a can include a flag or indication in the media content establishing a priority of the media content or requesting that the media content not be rendered at a reduced frame rate. In some implementations, the author settings 224a can additionally include a target frame rate.

The HTML parameters 224b can include a tag or indication referencing a priority of particular media content, a size and position of the media content in the graphical rendering of an HTML document, or an order of loading in comparison to other media content included in the HTML document. If the instance 218 is not rendered within an HTML document, the presentation parameters 224c can include similar information as the HTML parameters 224b.

The instance characteristics 224 and, optionally, additional information are fed to the prioritization rules 220. For example, the prioritization rules 220 can receive recent user input events, such as the instance 218 which most recently received user interaction (e.g., a click, mouse-over, etc.). The prioritization rules 220 can apply a precedence value based upon the information received. In some implementations, individual instance characteristics 224 can be weighted according to importance. For example, author settings 224a may be judged as having greater importance than the presentation parameters 224c. If, for example, the author settings 224a include an indication that the media content not be rendered at a reduced frame rate, the prioritization rules 220 can mark the associated instance 218 as being ineligible for receiving a processing allocation modification. In another example, the instance 218 which most recently received user interaction can be automatically deemed the instance 218 having precedence.

In some implementations, the prioritization rules 220 can be applied to give the largest visible instance 218, actively rendering video content to the display, precedence over the remaining instances 218. Once the video content ceases to play within the largest visible instance 218, the precedence settings can change to promote an instance actively rendering video content to the display. If none of the instances 218 are actively rendering video content to the display, for example, the prioritization rules 220 can determine that none of the instances 218 are currently eligible for a processing allocation modification.

Instances 218 actively rendering video content to the display, in some implementations, can receive higher priority than those not actively rendering video content. For example, the prioritization rules can classify the instances 218 to award a highest priority to the instance receiving user interaction or, if none have received a user event, the largest and most centrally located instance actively rendering video content to the display. The size and position, for example, can be determined through the HTML parameters 224b or the presentation parameters 224c. The second highest priority can be given to those ineligible for processing allocation modification, for example based upon the author settings 224a. In a priority level below this, the prioritization rules 220 can group any other instances actively rendering video content to the display. The lowest priority level, in this example, can be awarded to the remaining instances 218, which are not actively rendering video content to the display.

If two or more media presentation programs 206 or 212 are rendering media content to the display device, in some implementations, a tiered throttling scheme can be used. For example, in addition to applying prioritization rules 220 to instances associated with media content in each media presentation program, and ranking these instances appropriately, the instances associated with a primary media presentation program (e.g., the largest, most centrally located upon the display device, or most recently interacted with by the user) can be promoted in view of each of the media presentation programs which do not take precedence.

At a later time, if user interaction causes the media content rendered by the primary instance to no longer be visible, in some implementations, the media player program 204 or 212 can remember the priority associated with the instance. For example, if a user is interacting with an Internet browser including a tab functionality, and the user navigates to a different tab or opens a new tab, the priority ranking of the instances associated with the media content positioned in the original tab can be recorded by the media player program 204 or 212. In this manner, when the user navigates back to the original tab, the media player program 204 or 212 will not have need to reapply prioritization rules 220 and instance ranking 222 to the instances rendering media content to the original tab.

Figure 3:
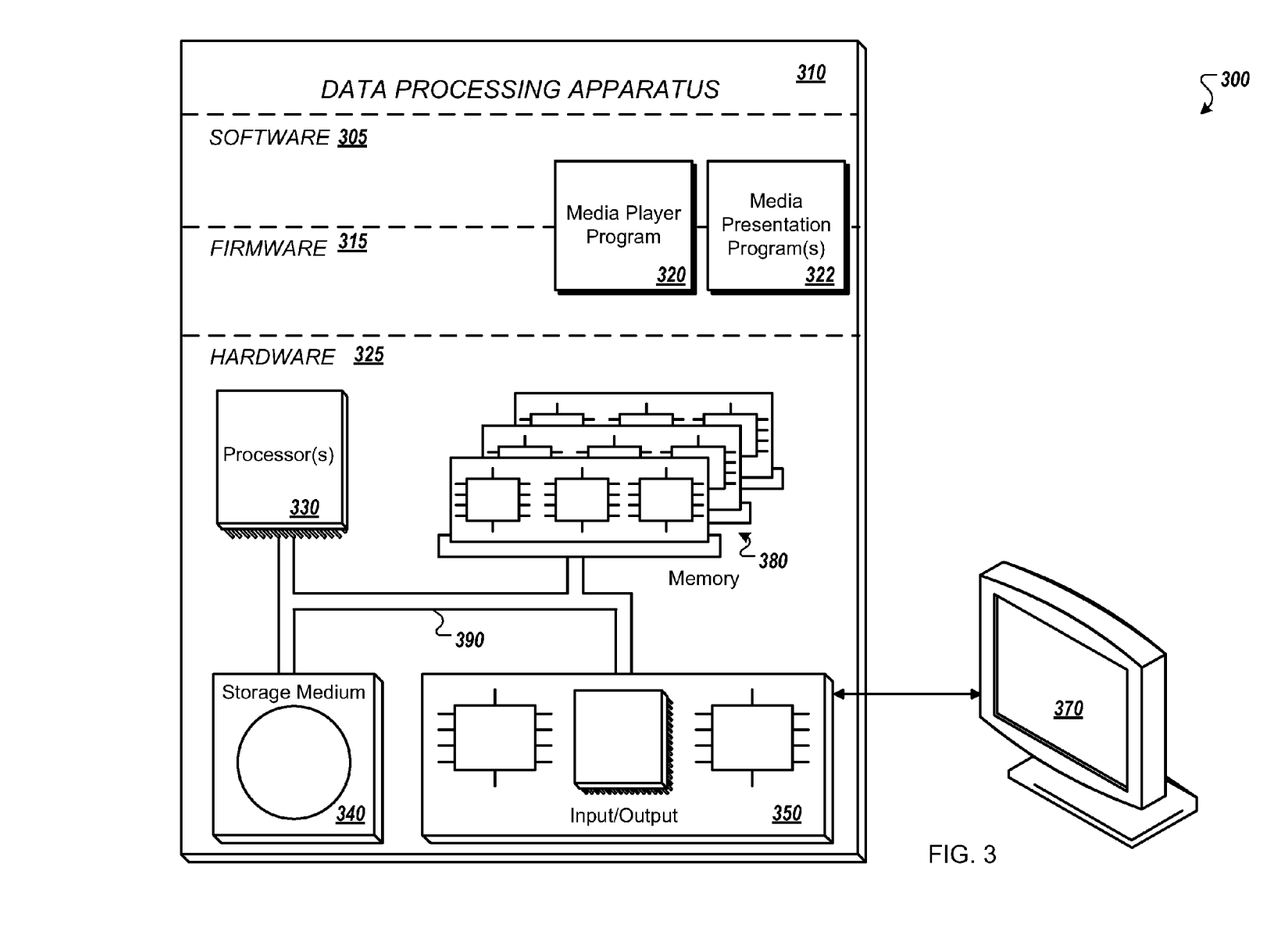
FIG. 3 is a block diagram of an example of an apparatus for throttling media player instances controlled by a media player program.

FIG. 3 is a block diagram of an example of an apparatus 300 for throttling media player instances controlled by a media player program. A data processing apparatus 310 can include hardware 325, firmware 315 and software 305, and can include a media player program 320 and one or more media presentation program(s) 322 operating in conjunction with the data processing apparatus 310 to effect various operations described in this specification. The media player program 320 and media presentation program(s) 322, in combination with the various hardware 325, firmware 315, and software 305 components of the data processing apparatus 310, represent one or more structural components in the apparatus 300, in which the algorithms described herein can be embodied.

The media player program 320 can be one or more applications for inputting, processing, and/or outputting media content (e.g., audio, video, graphical, and/or textual data). The media player program 320 can input media information from the other applications installed in the data processing apparatus 310, one or more storage mediums accessible to the data processing apparatus 310, or remotely through a network. The media player program 320 can output media information to one or more output devices such as a display device 370 and, optionally, one or more speakers. An application refers to a computer program that the user perceives as a distinct computer tool used for a defined purpose. An application can be built entirely into an operating system or other operating environment, or it can have different components in different locations (e.g., a remote server). The media player program 320 can include or interface with other software. The media player program 320 can include a stand alone media player program, a media player program that relies on a runtime environment to operate (e.g., a JAVA® virtual machine or an ADOBE AIR® runtime environment), or multiple different media player programs, which can be stand alone, browser-based, or runtime environment-based, in some examples.

Interface software can also be included that operates over a network to interface with other processors, such as in a media server communicating with the data processing apparatus 310 to provide streaming media content.

The hardware level 325 of the data processing apparatus 310 includes one or more processors 330, a memory 380, and at least one computer-readable medium 340 (e.g., random access memory, storage device, etc.). The hardware level 325 can also include one or more input/output devices 350, including one or more user interface devices.

Each of the components 330, 340, 350, and 380 are interconnected using a system bus 390. The processor(s) 330 can process instructions for execution within the apparatus 300. In some implementations, one or more single-threaded processors can be included within the processor(s) 330. In other implementations, one or more multi-threaded processors can be included within the processor(s) 330. In some implementations, the processor(s) 330 can process instructions stored in the memory 380, or on the computer-readable medium 340, to display graphical information on a display device.

The memory 380 can be a computer-readable medium used to store information within the apparatus 300 and can include a volatile memory unit, a non-volatile memory unit, or both. The storage device 340 can provide mass storage for the apparatus 300. The storage device 340 can include a floppy disk device, a hard disk device, an optical disk device, or a tape device.

The input/output devices 350 provide input/output operations for the apparatus 300. The input/output devices 350 can include a keyboard, mouse, stylus or pointing device, a display unit for displaying graphical user interfaces such as the display device 370, a modem or other networking hardware/firmware, or any combination thereof to name a few examples.

The subject matter described in this specification can also be used in conjunction with other input/output devices, such as a printer or scanner. An input/output device can be used to connect to a network, and can furthermore connect to one or more processors via a network (e.g., the Internet).

Therefore, a user of the media player program 320 or media presentation program(s) 322 does not need to be local, and may be connecting in a wired or wireless fashion using an internet or intranet connection on a personal computer, PDA, smartphone (e.g., a cellular phone including an operating system and advanced computing capabilities), or using other suitable hardware and software at a remote location, such as a remote computer communicatively coupled through a coax cable or other communication line with a television having a computer included therein. For example, a user can access a web interface via the remote processor in order to engage in a video viewing session. In any event, data can be transmitted over a network to and from the data processing apparatus 310. Note that the data processing apparatus 310 can itself be considered a user interface device (e.g., when the media player program 320 or the media presentation program(s) 322 are delivered by a remote server as a web service).

The apparatus 300 can be used for throttling media player instances controlled by the media player program 320. A portion of the media player instances may be rendered through an additional application, such as one or more of the media presentation programs 322. In some examples, the media presentation programs 322 can include one or more Internet browser applications, media content editing applications, interactive gaming applications, video conferencing applications, or media sharing applications. The media player program 320 can track individual instances rendering media content to a visible portion of the display device 370. To preserve resources, such as processor cycles of the processor(s) 330 or memory space in the memory 380 or the storage medium 340, the media player program 320 can reduce a processing allocation for one or more instances which do not have precedence over a primary instance.

In some implementations, the media player program 320 receives an indication from the data processing apparatus 310 that resources are near capacity. For example, the media player program 320 can query system firmware to determine a current CPU usage of the processor(s) 330 or memory space available in the memory 380. Based upon resource capacity, the media player program 320 can determine which instance(s) to throttle and by how much. For example, in the circumstance of very limited resources, the media player program 320 can pause or disable one or more instances. If, instead, the CPU usage is at about ninety-five percent load, for example, the media player program 320 can throttle one or more instances.

Figure 4A:
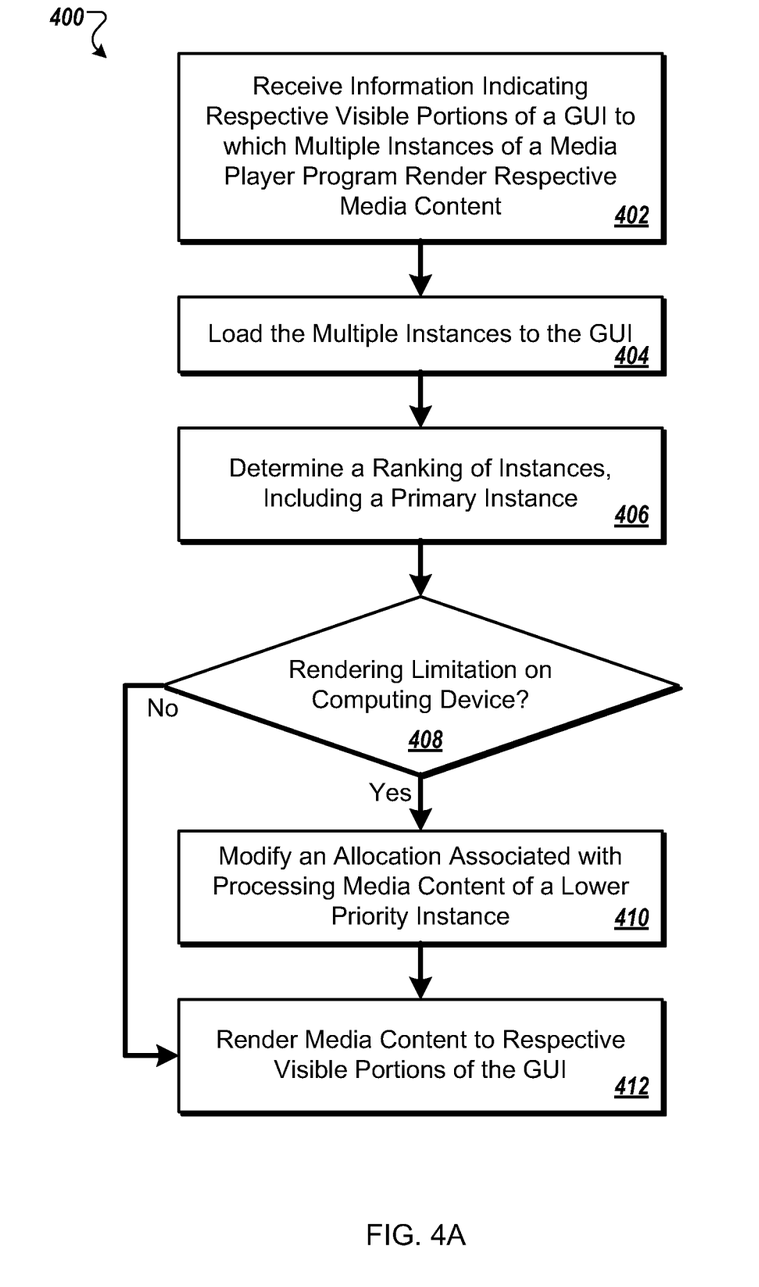
FIGS. 4A and 4B are flow charts of examples of processes for throttling media player instances controlled by a media player program.
Figure 4B:
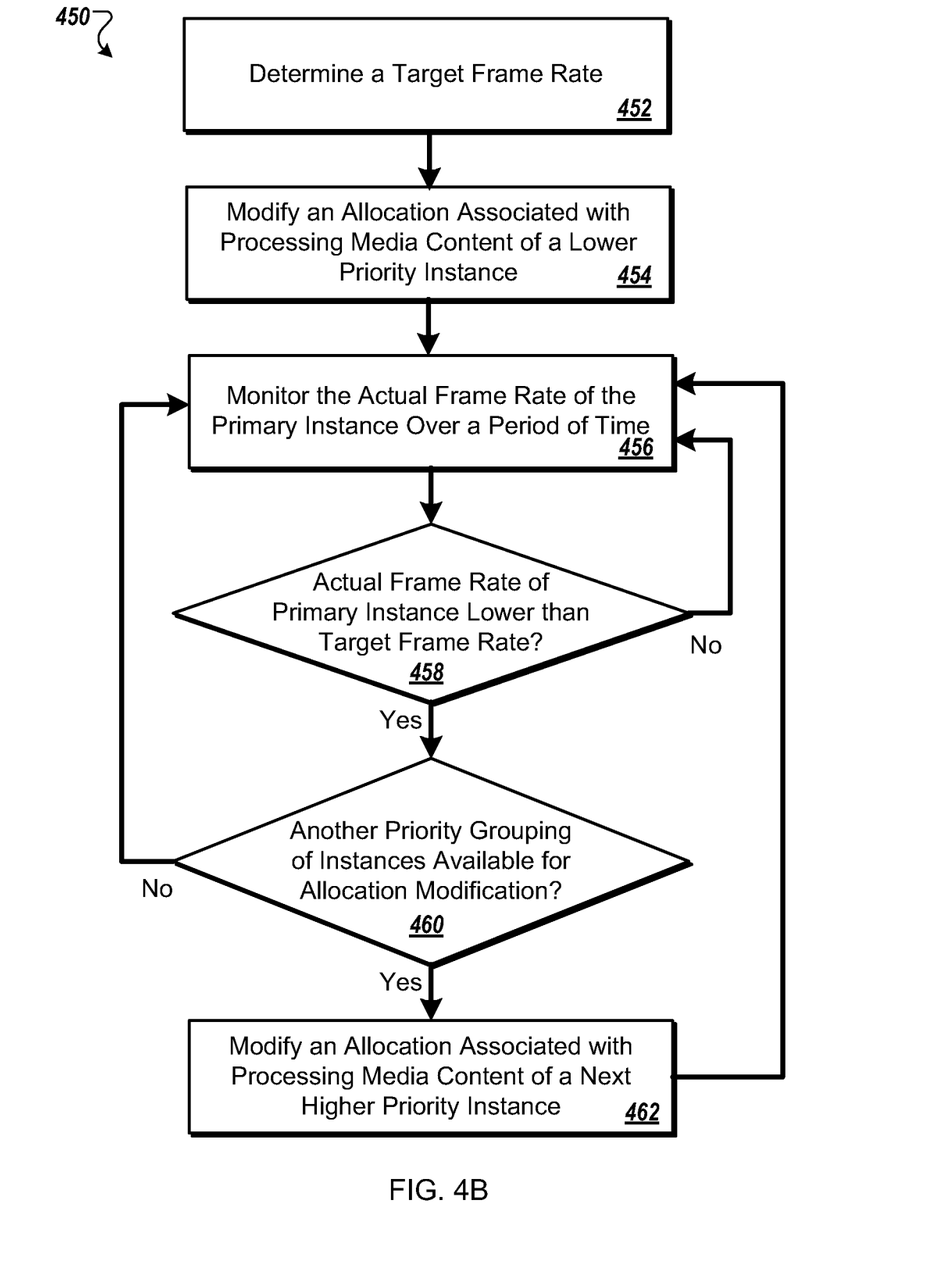

FIGS. 4A and 4B are flow charts of examples of processes for throttling media player instances controlled by a media player program. The media player instances can each render media content to respective portions of a display device in communication with a computing device. The processes described, for example, can be executed upon the system 200 described in relation to FIG. 2 or the apparatus 300 described in relation to FIG. 3.

As shown in FIG. 4A, a process 400 includes receiving, at a media player program, information from an additional program indicating respective visible portions of a graphical user interface (GUI) to which multiple instances of a media player program render respective media content (402). The additional program can be configured to render additional content, different than the media content, to the GUI. In some implementations, the additional program may miscalculate whether particular media content is in view on a display device. For example, if the display device is a small mobile device such as a mobile phone or a personal data assistant (PDA), and the user has zoomed in on a section of the GUI, the additional program may provide information indicating the respective visible portions of the GUI to which the instances would render media content if the display were zoomed all the way out. As such, the determination of whether a particular instance is rendering media content to a visible portion of the GUI can suffer a degree of inaccuracy. Depending upon the level of communication between the media player program and the additional program, the media player program may not be provided with any further indication regarding which instances are rendering media content to a visible portion of the display. Alternatively, the additional program may provide information regarding a zoom and focus region of the display content, providing the media program with additional cues for discerning which instances are central to the display or otherwise visible to the user.

The multiple instances of the media player program are loaded in the respective visible portions of the GUI (404). For example, the media player program instances can be initialized and prepared to render media content to the respective visible portions of the GUI. In some implementations, during loading, a rendering limitation may be recognized by the media player program. For example, the computing device may not have adequate processing resources to load media content associated with every instance rendering to visible portions of the GUI. In this circumstance, the loading of one or more of the instances may be delayed until after a ranking of instances is determined, so that only a portion of the instances are loaded.

A ranking of instances is determined, including a primary instance (406). In a first circumstance, one instance can be considered to take precedence over the remainder of the multiple instances of the media player program. The remaining instances, optionally, can be further separated into priority level groupings or ranked in order of priority. In some implementations, the priority level groupings can include a nonadjustable priority level which is ineligible for processing allocation modification. For example, if the media player program is rendering media content related to a video conferencing program, each collaborator included in the video conference can be allocated a nonadjustable priority level, such that the image of each user engaged in the videoconference can be presented at best frame rate. Precedence, in some implementations, can be determined in part through application of a series of rules. The rules can depend, in some examples, on a size, position, priority identification, or user interaction associated with a respective visible portion of the GUI in which each instance is rendering media content.

If there is a rendering limitation on the computing device (408), an allocation associated with processing media content of a lower priority instance is modified (410). In some implementations, the rendering limitation is a central processing unit (CPU) usage threshold. For example, if the CPU usage meets or exceeds a ninety-five percent threshold value, an allocation associated with processing media content of a lower priority instance can be modified. The rendering limitation, in some implementations, can be determined by monitoring an actual frame rate associated with the instance determined to take precedence, and comparing the actual frame rate with a target frame rate. In another example, if the battery of the computing device is determined to be running at or below a threshold charge, a processing allocation can be modified.

In some examples, all instances other than the priority instance, a lowest priority grouping of instances, or a single lowest ranking priority instance can undergo a processing allocation modification in accordance with the rendering limitation. The processing allocation modification, for example, can include lowering the actual frame rate of at least one instance. In some implementations, a memory allocation is modified. For example, a memory allocation can be modified which impacts a rendering optimization affecting a frame rate of the at least one instance. The memory allocation modification may allow the instance to maintain a substantially identical visual output to the GUI. For example, the same graphics output can be rendered to the display, while the processing of the video content differs from the processing style used without memory allocation modification. The frame rate of the video content may or may not be affected by the memory allocation modification. Meanwhile, the priority instance can receive a memory allocation modification providing greater resources, allowing the priority instance to process video content more efficiently and therefore, potentially, increasing the frame rate of the priority instance.

Media content is rendered to respective visible portions of the GUI (412). If one or more instances have undergone a processing allocation modification, the respective media content may be rendered at a lower rate than that rendered by the instance taking precedence.

A process 450, illustrated in FIG. 4B, describes a method for recognizing a rendering limitation associated with the computing device by monitoring an actual frame rate associated with the highest precedence instance. The process 450 includes identifying a target frame rate associated with the priority instance (452). The priority instance, for example, can be the instance determined by the process 400, described in relation to FIG. 4A, as the instance taking precedence over the remaining multiple instances.

The target frame rate, in some examples, can be indicated within the media content itself, established by the media player program, or determined based upon the characteristics and capabilities of the computing device or display device. For example, if no frame rate information exists within the media data, a target frame rate can be based upon the hardware capabilities of the computing device, the refresh rate of the display device, the processing needs of concurrent applications running upon the computing device, available battery power of the computing device, the visual capabilities of the human eye, or a combination thereof. Alternatively, a default target frame rate can be applied.

In some implementations, the target frame rate refers to a range of values. For example, a target frame rate can be set to range between a trigger rate, at which the process 450 can begin to apply allocation modifications to improve frame rate when the actual frame rate is below or equivalent to this value, and a maximum adjustment rate, at which the process 450 can cease to apply allocation modifications. For example, based upon a requested frame rate of sixty frames per second, a configured maximum rate of fifty frames per second, and a minimum acceptable frame rate of thirty frames per second, the target frame rate may range between a trigger rate of thirty frames per second and a maximum adjustment rate of fifty frames per second (e.g., the lower of the requested value or the configured value). If the actual frame rate, for example, falls below or at thirty frames per second, the process 450 can apply allocation modifications until the actual frame rate is calculated at or above fifty frames per second. In other implementations, the target frame rate can be specified in terms of processing times (e.g., from twenty milliseconds to thirty-three milliseconds).

An allocation associated with processing media content of a lower priority instance is modified (454). For example, a lowest priority grouping of instances, or a single lowest ranking priority instance, can undergo a processing allocation modification.

The actual frame rate of the primary instance is monitored over a period of time (456). In some implementations, the monitoring occurs over a sample number of frames. For example, over a processing period of thirty frames, processing time can be collected and averaged to determine an actual frame rate. In other implementations, the monitoring occurs over a set period of time. For example, within a time period of one second (e.g., approximately forty frames if a target frame rate of forty frames per second is being maintained), the number of frames processed can be used to determine an actual frame rate.

If the actual frame rate of the primary instance is lower than the target frame rate (458), and another priority grouping of instances is available for allocation modification (460), an allocation associated with processing media content of a next higher priority instance is modified (462). For example, if two or more priority levels are defined in addition to the priority instance taking precedence over the other instances, and each priority level is eligible for processing allocation modification, an allocation associated with the next highest priority level grouping of instances, or the next highest ranked single instance, can undergo modification in an attempt to improve the actual frame rate of the priority instance. The processing allocation modification applied may be the same as applied to the lowest priority instance(s), or it may be a different style of processing allocation modification. In some implementations, as priority level increases, the amount of processing allocation modification may be reduced, so as to cause less effect upon the user experience related to the rendering of media content by the higher priority instances.

In some implementations, if all priority groupings eligible for processing allocation modification have undergone modification, and the actual frame rate does not meet the target frame rate, additional processing allocation modifications can be applied. For example, a first round of processing allocation modifications may be less significant than a second round applied to the same instance(s). The first round of processing allocation modifications can slow the frame rate of one or more instances, for example, while the second round of processing allocation modifications can stall one or more instances. In another example, each round of processing allocation modifications can incrementally slow the frame rate (e.g., half rate, quarter rate, etc.).

If, instead, the actual frame rate of the primary instance is found to meet or exceed the target frame rate, and one or more other instances previously underwent a processing allocation modification, the processing allocation modification(s) may be reversed. For example, if a temporary load on the processing capacity of the computing device has been lifted (e.g., a processor-intensive program has been terminated, a memory-intensive function has ended), the user experience can be improved by reducing or eliminating the previously applied processing allocation modifications.

The process can continue to monitor the actual frame rate of the primary instance over additional periods of time (456) and make additional processing allocation modifications (462) as necessary.

Figure 5:
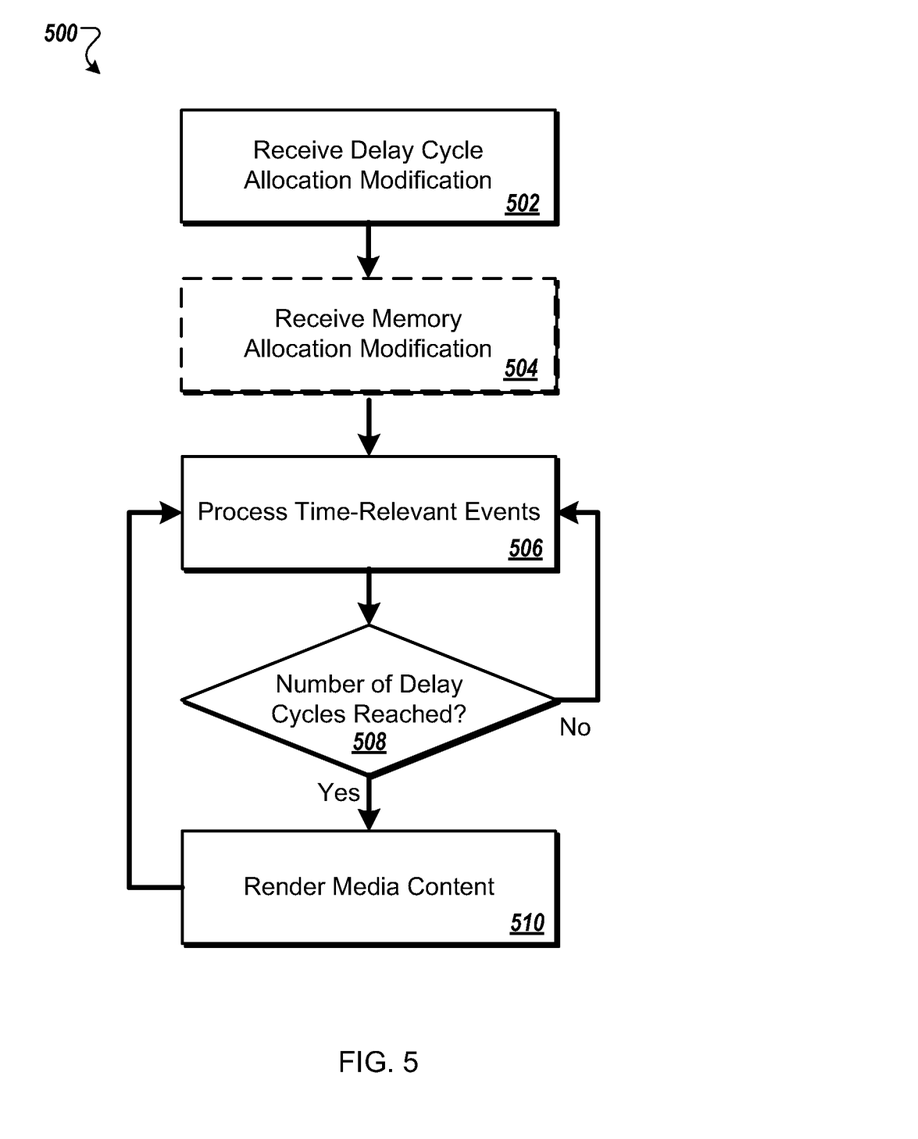
FIG. 5 is a flow chart of an example of a process for modifying an allocation associated with processing media content by a media player instances controlled by a media player program.

FIG. 5 is a flow chart of an example of a process 500 for modifying an allocation associated with processing media content by media player instances controlled by a media player program. The allocation can be modified in response to a rendering limitation associated with the computing device processing the media content.

The process 500 includes receiving a delay cycle allocation modification specifying a number of delay cycles to apply to a code section of a media player program instance (502). The delay cycles, for example, can pertain to a number of loops of a media player program instance subroutine which processes events (e.g., a scripting portion of media content) and renders graphics to a display (e.g., a video portion of media content).

Optionally, a memory allocation modification can be received (504). In some implementations, the memory allocation modification refers to restraining a maximum memory space available to the instance. For example, the instance may be provided with less temporary storage area, causing the instance to repeat the processing of one or more operations, such as a bitmap expansion of a compressed image, rather than storing the resultant information for the next time the same processing step is called within the code section.

Time-relevant events are processed (506). For example, user input events, system events, scripting function calls, and other important calls can be recognized during the execution of the code section and processed accordingly. In some implementations, the time-relevant event may have an effect upon the number of delay cycles. For example, if the instance receives a user interaction event, such as a click event, the precedence of the instance can be immediately promoted and, accordingly, any processing allocation modifications applied can be removed, reversed, or otherwise modified to promote a better end user experience.

If a number of delay cycles has been reached (508), media content is rendered (510). Otherwise, the code portion can be exited without rendering media content. For a delay cycle of length N, every Nth call to the code section can include rendering media to a display device. In other words, while the instance may be functioning within the code section at a first rate, the overall frame rate is equivalent to 1/Nth the first rate. In this manner, the frame rate of the instance can be reduced without ignoring potentially time-relevant events such as user interaction.

The frame rendering, although slowed, can be processed in the same fashion as it had been prior to the processing allocation modification. In some implementations, no frames are dropped and no modification of frame rendering or graphic scripting processing is made. The frame content rendering and graphic scripting processing, instead, can be delayed to occur at every Nth call to the code section.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a PDA, a mobile audio or video player, a game console, a television, a GPS receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
loading multiple instances of a media player program to render respective media content in respective visible portions of a graphical user interface of a computing device, the graphical user interface associated with an additional program configured to render additional content, different than the media content, to the graphical user interface;
rendering, in the multiple instances, the respective media content in the respective visible portions of the graphical user interface;
determining that a first of the multiple instances of the media player program takes precedence over a second of the multiple instances of the media player program;
determining that an actual frame rate associated with the first of the multiple instances of the media player program is lower than a target frame rate associated with the first of the multiple instances of the media player program;
reducing an allocation, associated with processing media content by the second of the multiple instances of the media player program, in accordance with a rendering limitation associated with the computing device and based at least in part on the determined precedence of the first of the multiple instances over the second of the multiple instances and further based at least in part on the determining that the actual frame rate is lower than the target frame rate; and
increasing the actual frame rate associated with the first of the multiple instances based at least in part on the reducing.

2. The method of claim 1, further comprising:
receiving information from the additional program that indicates the respective visible portions of the graphical user interface to which the multiple instances of the media player program render their respective media content.

3. The method of claim 1, wherein the reducing comprises specifying a number of delay cycles to apply to a code section of the second of the multiple instances of the media player program, the code section configured to:
process a set of time-relevant events received by the second of the multiple instances of the media player program; and
exit the code section, when the number of delay cycles has not been reached, before a media content rendering portion of the code section.

4. The method of claim 1, wherein the determining that a first of the multiple instances of the media player program takes precedence comprises comparing a first priority level associated with the first of the multiple instances of the media player program and a second priority level associated with the second of the multiple instances of the media player program, wherein the first priority level is one of at least three respectively-ranked priority levels, and wherein the determining that the actual frame rate is lower than the target frame rate further comprises:
identifying a target frame rate associated with the first of the multiple instances of the media player program; and
monitoring an actual frame rate of the first of the multiple instances of the media player program over a period of time, after modifying the allocation; and
the method further comprising: modifying an allocation, associated with processing media content by a third of the multiple instances of the media player program, based at least in part on a comparison of the actual frame rate with the target frame rate, the third of the multiple instances of the media player program having a third priority level, the third priority level being next in rank to the second priority level.

5. The method of claim 4, wherein the at least three priority levels include a nonadjustable priority level ineligible for processing allocation modification.

6. The method of claim 4,
wherein the multiple instances of the media player program render respective media content within a single graphical user interface window, and
wherein the at least three priority levels are ranked respectively using a set of prioritization rules, including a sizing prioritization rule based at least in part upon respective dimensions of the respective visible portions of the graphical user interface in which the multiple instances of the media player program render.

7. The method of claim 1, wherein the allocation is a processing time allocation, the method further comprising:
modifying a memory allocation that impacts a rendering optimization affecting a frame rate of the second of the multiple instances of the media player program while maintaining a substantially identical visual output to the graphical user interface.

8. The method of claim 1, wherein the rendering limitation is a central processing unit usage threshold.

9. A computer storage medium encoded with a computer program, the program comprising instructions that when executed by data processing apparatus cause the data processing apparatus to perform operations comprising:
loading multiple instances of a media player program to render respective media content in respective visible portions of a graphical user interface of a computing device, the graphical user interface associated with an additional program configured to render additional content, different than the media content, to the graphical user interface;
rendering, in the multiple instances, the respective media content in the respective visible portions of the graphical user interface;
determining that a first of the multiple instances of the media player program takes precedence over a second of the multiple instances of the media player program;
determining that an actual frame rate associated with the first of the multiple instances of the media player program is lower than a target frame rate associated with the first of the multiple instances of the media player program;
reducing an allocation, associated with processing media content by the second of the multiple instances of the media player program, in accordance with a rendering limitation associated with the computing device and based at least in part on the determined precedence of the first of the multiple instances over the second of the multiple instances and further based at least in part on the determining that the actual frame rate is lower than the target frame rate; and
increasing the actual frame rate associated with the first of the multiple instances based at least in part on the reducing.

10. The computer storage medium of claim 9, the operations further comprising:
receiving information from the additional program that indicates the respective visible portions of the graphical user interface to which the multiple instances of the media player program render their respective media content.

11. The computer storage medium of claim 9, wherein the reducing comprises specifying a number of delay cycles to apply to a code section of the second of the multiple instances of the media player program, the code section configured to:
process a set of time-relevant events received by the second of the multiple instances of the media player program; and
exit the code section, when the number of delay cycles has not been reached, before a media content rendering portion of the code section.

12. The computer storage medium of claim 9, wherein the determining that a first of the multiple instances of the media player program takes precedence comprises comparing a first priority level associated with the first of the multiple instances of the media player program and a second priority level associated with the second of the multiple instances of the media player program, wherein the first priority level is one of at least three respectively-ranked priority levels, and wherein the determining that the actual frame rate is lower than the target frame rate further comprises:
identifying a target frame rate associated with the first of the multiple instances of the media player program; and
monitoring an actual frame rate of the first of the multiple instances of the media player program over a period of time, after modifying the allocation; and
the operations further comprising: modifying an allocation, associated with processing media content by a third of the multiple instances of the media player program, based at least in part on a comparison of the actual frame rate with the target frame rate, the third of the multiple instances of the media player program having a third priority level, the third priority level being next in rank to the second priority level.

13. The computer storage medium of claim 12, wherein the at least three priority levels include a nonadjustable priority level ineligible for processing allocation modification.

14. The computer storage medium of claim 12,
wherein the multiple instances of the media player program render respective media content within a single graphical user interface window, and
wherein the at least three priority levels are ranked respectively using a set of prioritization rules, including a sizing prioritization rule based at least in part upon respective dimensions of the respective visible portions of the graphical user interface in which the multiple instances of the media player program render.

15. A system comprising:
a display device capable of displaying a graphical user interface;
a computer storage medium; and one or more processors operable to interact with the computer storage medium and to perform operations comprising:

loading multiple instances of a media player program to render respective media content in respective visible portions of the graphical user interface of a computing device, the graphical user interface associated with an additional program configured to render additional content, different than the media content, to the graphical user interface;

rendering, in the multiple instances, the respective media content in the respective visible portions of the graphical user interface;

determining that a first of the multiple instances of the media player program takes precedence over a second of the multiple instances of the media player program;

determining that an actual frame rate associated with the first of the multiple instances of the media player program is lower than a target frame rate associated with the first of the multiple instances of the media player program;

reducing an allocation, associated with processing media content by the second of the multiple instances of the media player program, in accordance with a rendering limitation associated with the computing device and based at least in part on the determined precedence of the first of the multiple instances over the second of the multiple instances and further based at least in part on the determining that the actual frame rate is lower than the target frame rate; and increasing the actual frame rate associated with the first of the multiple instances based at least in part on the reducing.

16. The system of claim 15, the operations further comprising:

receiving information from the additional program that indicates the respective visible portions of the graphical user interface to which the multiple instances of the media player program render their respective media content.

17. The system of claim 15, wherein the reducing comprises specifying a number of delay cycles to apply to a code section of the second of the multiple instances of the media player program, the code section configured to:

process a set of time-relevant events received by the second of the multiple instances of the media player program; and exit the code section, when the number of delay cycles has not been reached, before a media content rendering portion of the code section.

18. The system of claim 15, wherein the determining that a first of the multiple instances of the media player program takes precedence comprises comparing a first priority level associated with the first of the multiple instances of the media player program and a second priority level associated with the second of the multiple instances of the media player program, wherein the first priority level is one of at least three respectively-ranked priority levels, and wherein the determining that the actual frame rate is lower than the target frame rate further comprises:

identifying a target frame rate associated with the first of the multiple instances of the media player program; and the operations further comprising: monitoring an actual frame rate of the first of the multiple instances of the media player program over a period of time, after modifying the allocation; and modifying an allocation, associated with processing media content by a third of the multiple instances of the media player program, based at least in part on a comparison of the actual frame rate with the target frame rate, the third of the multiple instances of the media player program having a third priority level, the third priority level being next in rank to the second priority level.

19. The system of claim 18, wherein the at least three priority levels include a nonadjustable priority level ineligible for processing allocation modification.

20. The system of claim 18, wherein the multiple instances of the media player program render respective media content within a single graphical user interface window, and wherein the at least three priority levels are ranked respectively using a set of prioritization rules, including a sizing prioritization rule based at least in part upon respective dimensions of the respective visible portions of the graphical user interface in which the multiple instances of the media player program render.

* * * * *